Dec. 27, 1966 C. A. MIVILLE ETAL 3,294,332

INCREMENTAL MAGNETIC TAPE RECORDER

Filed April 16, 1964 3 Sheets-Sheet 1

INVENTORS
Charles A. Miville
Fred Hugel

BY [signature]
ATTORNEY

Dec. 27, 1966 C. A. MIVILLE ETAL 3,294,332

INCREMENTAL MAGNETIC TAPE RECORDER

Filed April 16, 1964 3 Sheets-Sheet 2

INVENTORS
Charles A. Miville
Fred Hugel

BY [signature]
ATTORNEY

INVENTORS
CHARLES A. MIVILLE
FRED HUGEL
BY Louis Etlinger
ATTORNEY

United States Patent Office 3,294,332
Patented Dec. 27, 1966

3,294,332
INCREMENTAL MAGNETIC TAPE RECORDER

Charles A. Miville, Mont Vernon, N.H., and Fred Hugel, West Acton, Mass., assignors to Sanders Associates, Inc., Nashua, N.H., a corporation of Delaware Filed Apr. 16, 1964, Ser. No. 360,258
17 Claims. (Cl. 242—55.12)

This invention relates to magnetic tape recorders, and more particularly, to such tape recorders for data handling, which require very little power to operate, and which are particularly adapted for use over long periods of time, and which occupy a minimum of space, as for instance, within an oceanographic current meter having an inside diameter of six inches.

Such instruments are customarily sunk in the ocean, moored in place, and periodically record desired information, such as the velocity and direction of water current, water temperature, salinity, and other parameters. It is expensive to send out a ship to recover the instrument, replace used batteries and tape, and sink it again; hence, it is important to provide a tape recorder fitting within the limited space available and above all, having the lowest possible current drain, so as to provide long operating life between battery replacements.

Such a recorder is particularly adapted and designed for use in an oceanographic current meter described and claimed in the patent application of Charles A. Miville, Serial No. 360,259, filed April 16, 1964, and entitled "Magnetic Tape Oceanographic Meter," which application is assigned to the assignee of this application.

The tape recorder described herein is capable of use in a variety of data handling applications, in addition to that in the magnetic tape current meter, particularly in cases where information is to be recorded periodically in cycles, and in which the recorder is idling or in stand-by condition for a large part of the time.

From the foregoing it will be understood that among the objects of this invention are the following:

To provide an incremental magnetic tape recorder which requires a minimum of power;

To provide such a recorder which occupies a minimum of space;

To provide such a recorder powered by batteries, for use in inaccessible places over long periods of time;

To provide such a recorder which operates cyclically in response to a signal indicating the time for information to be recorded and which, at all other times, is in standby condition drawing no power; and To provide such a recorder in which signals are recorded in digital form while the tape is stationary, then the tape is stepped to a new recording position and returns to standby condition until there is additional information to record.

Still other objects and advantages of our invention will be apparent from the specification.

The features of novelty which we believe to be characteristic of our invention are set forth with particularly in the appended claims. Our invention itself, however, both as to its fundamental principles and as to its particular embodiments, will best be understood by reference to the specification and accompanying drawings, in which FIG. 1 is a top plan view of a tape recorder in accordance with our invention;

Figure 6:
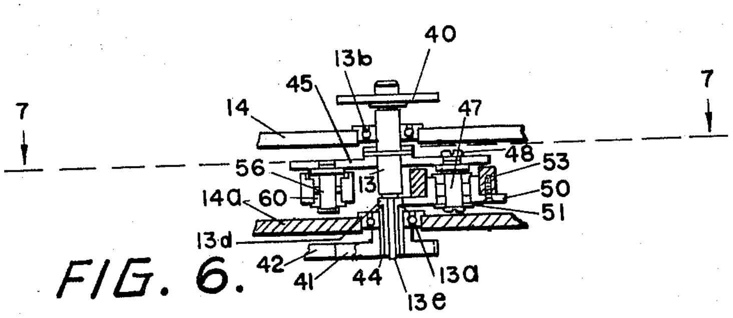
Figure 7:
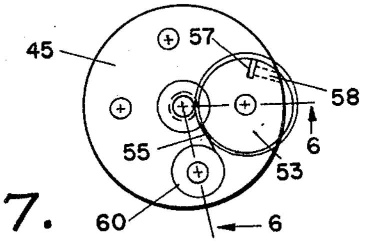

FIG. 6 is a sectional view of the "NegAtor" spring drive on reel shaft 13, on lines 6—6 of FIG. 7, which is the same as or a mirror image of that on reel shaft 12;

FIG. 7 is a plan view on lines 7—7 of FIG. 6; and

Figure 8:
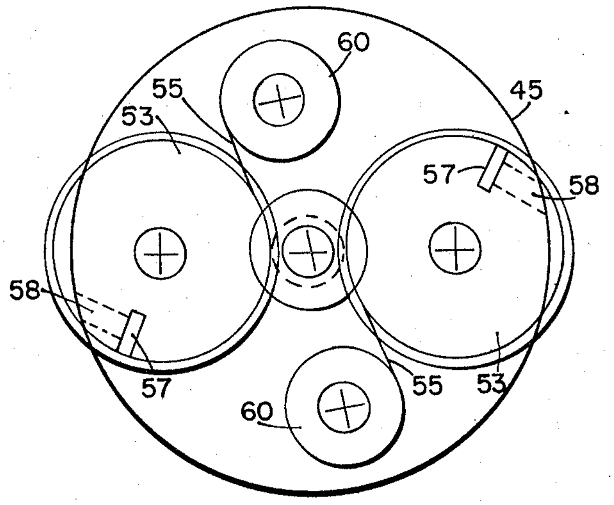

FIG. 8 is a plan view of another embodiment of the NegAtor spring drive shown in FIG. 7.

Referring now more particularly to FIGS. 1–5, 10 indicates the takeup reel, and 11 the supply reel, mounted for rotation on shafts 12 and 13 respectively, both rotating in the same direction in this embodiment of the invention, although it will be understood that they may equally well rotate in opposite directions. Shafts 12 and 13 pass through top deck plate 14 on which is mounted recording head 15, of customary well known construction. Recording head 15 may have a base plate 16 extending outwardly, and may be secured to top deck plate 14 by suitable bolts 17*a* and 17*b*.

The tape 9 from supply reel 11, which in this example of the invention, rotates clockwise, passes around idler roller 19*a* on pivoted tape tension arm 19, then around idler roller 21, mounted by bolt 21*a* on upper deck plate 14, past recording head 15, then between drive capstan 18 and pinch roller 20, and around idler roller 22*a* on pivoted tape tension arm 22, to takeup reel 10, which in this instance also rotates clockwise. Pivoted tape tension arms 19 and 22 are pivoted on reel shafts 13 and 12 respectively, below the reels but above the top deck plate 14, and are spring biased, arm 19 for clockwise rotation and arm 22 for counterclockwise rotation, and each is biased for rotation as described by springs 19*b* and 22*b*, respectively, each secured at one end to its respective arm and at the other to top deck plate 14. Pinch roller 20 is pivotally mounted for rotation in bifurcated bracket 24. Bracket 24 is pivotally mounted on shoulder screw 25 and is biased counterclockwise by spring 26, one end of which is attached to pin 24*a* on bracket 24, so that pinch roller 20 presses the tape against drive capstan 18. Other well known arrangements may be employed, if desired, for mounting pinch roller 20 so as to press against the tape as it passes around the capstan.

The capstan 18 is driven by stepping motor 30 and has shaft 31 projecting through an opening 32 in upper deck plate 14, and capstan 18, the lower end of which has a hollow skirt 33, is fitted around the end of motor shaft 31 and pinned to it, by pin 34. Lower deck plate 14*a*, detachably mounted in end plate 14*b* by bolts 14*c* passing through a skirt portion of lower deck plate 14*a*, is provided with an opening 35 permitting stepping motor 30 to be secured to the underside of upper plate 14, as by screws 36*a* and 36*b*. We provide a separate piece capstan, rather than using the motor shaft as a capstan, so as to allow a choice of the proper capstan diameter which when stepped through a particular rotation angle, will move the tape the desired amount. It should be kept in mind that motor 30 is a stepping motor, not a continuous rotation motor as customary in tape recorders for sound, pictures, etc.

Reel shaft 13 is mounted in ball bearings 13*a* in the lower deck plate 14*a*, and ball bearings 13*b* in upper deck plate 14, and tape tension arm 19 is mounted on shaft 13 in ball bearings 13*c*. Tape tension arm 19 is omitted from FIG. 6 for clarity (see FIG. 2). The same is true of reel shaft 12, the parts associated with which are either the same as, or mirror images of those associated with reel shaft 13.

To reduce the load on stepping drive motor 30 and thereby permit the use of a lower power drive motor than would otherwise be needed, a so-called "NegAtor" spring drive is employed. A simple mechanical analogy may be of assistance in understanding the principles employed in such drive. Consider two men having a "tugof-war," each pulling in opposite directions on opposite ends of a rope, and each pulling with a force of 10 pounds. The rope is stretched taut, the pulls exerted balance, and the rope does not move linearly. Now consider a third man at the center of the rope. By exerting a small force, say a few ounces, he unbalances the force equilibrium and causes the rope to move. In this analogy, the "NegAtor" spring drives associated with reel shafts 12 and 13 attempt to drive reel shafts 12 and 13 in opposition so as to cause tension in the tape, but almost exactly balance, so that a relatively small force, exerted by the capstan, is able to upset the approximate balance of forces and pull the tape past the recording head. In this arrangement, the capstan is in effect a tape metering device, assuring constant feed of tape past the recording head, and this permits the use of a smaller power stepping driving motor than would be necessary with conventional drives, in turn greatly increasing the battery life, and, when used in a magnetic tape current meter, greatly lengthening the operating period of the meter between battery replacements.

Figures 1, 2:
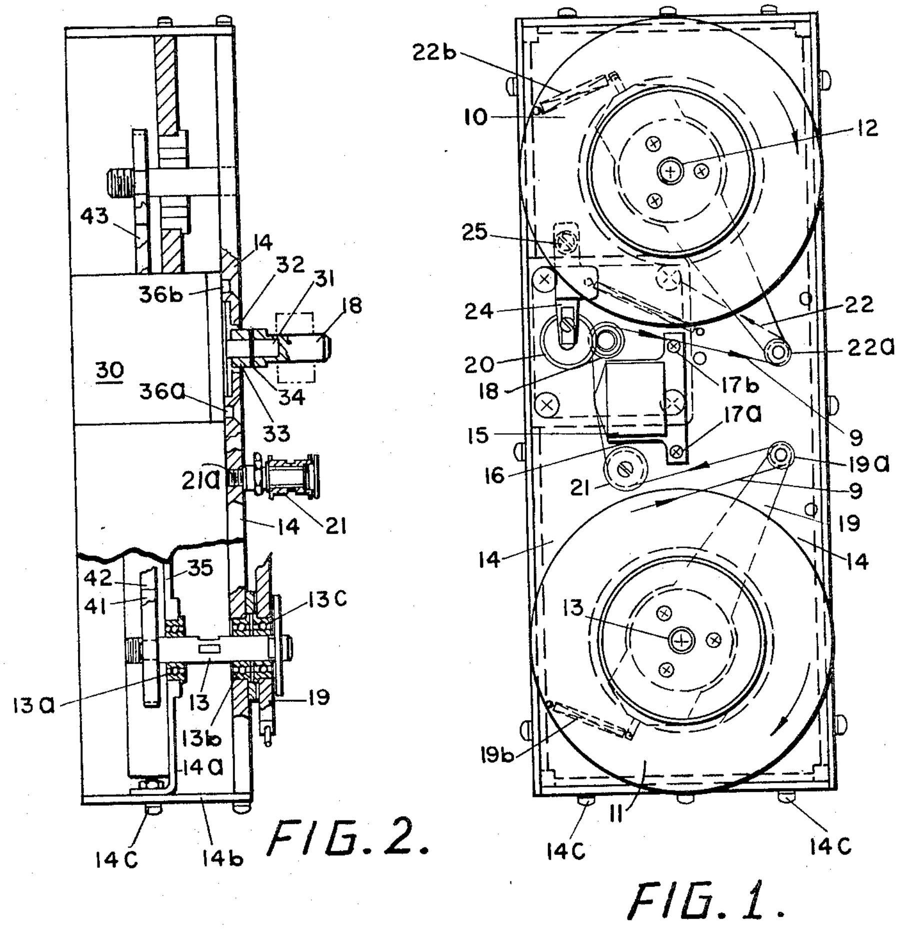
FIG. 2 is a rear elevation view, partly in section.
Figure 3:
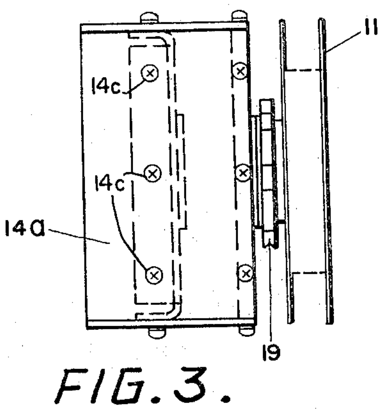
FIG. 3 is an end elevation view.
Figure 4:
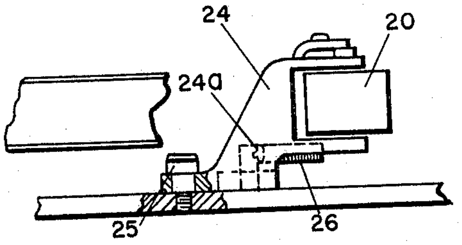
FIG. 4 is a detail front elevation view of the pinch roll assembly, partly in section.
Figure 5:
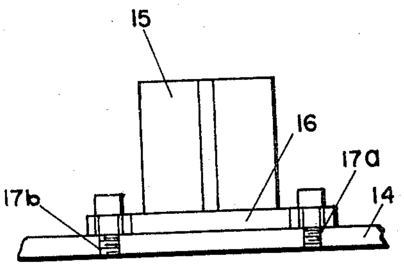
FIG. 5 is a detail elevation view of the recording head.

The details of the "NegAtor" spring drive are omitted from FIGS. 1–5, but are shown in FIGS. 6 and 7. In these figures, as before, 13 designates the reel shaft, 14 the top deck, and **14*a* the lower deck. Reel support plate 40, a circular plate secured to reel shaft 13, receives and holds reel 11. The bottom end of shaft 13 carries belt pulley 41 which rotates concentrically about shaft 13, and a similar belt pulley 43 is mounted on reel shaft 12 at the bottom (as seen in FIG. 2). Endless belt 42** passes over both pulleys and is kept taut by a well known arrangement of an idler pulley mounted on a spring biased arm (idler and arm not shown). The magnetic tape corresponds to the rope in the analogy above. The "NegAtor" spring drive, one part of which, on each reel shaft, corresponds to the men at each end of the rope in the analogy, is associated with each reel shaft in a manner now to be described.

Reel shaft 13 has a reduced portion **13*e* at its lower end about which sun gear 13*d* rotates. This sun gear 13*d* has an extended hub 44 which rotates in bearings 13*a*. Belt pulley 41 is attached to hub 44 and thus to sun gear 13*d*. Belt 42 connects sun gear 13*d* to its counterpart in the take-up reel assembly. By this arrangement, the center or sun gear in each reel assembly is tied to the center or sun gear in the other reel assembly. To permit free rotation of the sun gear 13*d* about the reduced end of shaft 13, the inside of gear hub 44** is fitted with antifriction bearings.

Circular support plate 45 is mounted on shaft 13 just below upper deck 14 and is keyed to it so as to rotate with shaft 13, and the upper end of reel shaft 13 is provided with ball bearings **13*b* where it passes through upper deck 14. Off center of circular support plate 45, on the lower side is a shouldered stud 47, mounted to circular support plate 45 by screw 48. A planetary gear 50 is mounted on stud 47 meshing with sun gear 13*d*, with ball bearing 51 interposed between gear 50 and stud 47. Gear 50 has secured to its upper end a drum 53 (FIGS. 6 and 7). Drum 53 receives one end of a flat coil or flat spiral spring 55. This spring, termed a "NegAtor" is forced to wind up around drum 53** in the opposite direction to its normal (preformed) coil direction.

Plate 45 also carries stud 56 mounted to it in similar fashion to stud 47. Stud 56 carries another ball bearing mounted drum 60, similar to drum 53 except smaller in diameter, about which spring 55 is coiled in its natural manner. The end of spring 55 need not be secured to drum 60, but its opposite end is secured in some suitable manner to drum 53, as for example, by being placed in slot 57 and held in place by set screw 58.

To provide a better force balance, two such spring and drum assemblies are preferably placed symmetrically about each sun gear **13*d*, as shown in FIG. 8, wherein similar parts are denoted by similar reference numerals, i.e., there are four springs 55, four spring take-up drums 53, and four spring supply drums 60** per recorder (2 on each reel assembly).

It will be seen that in being forced to coil around drum 53, spring 55 is bent against its coiling bias, and at all times exerts a force which tends to rotate drum 53 in a counterclockwise direction in FIG. 7. This rotation of drum 53 and thus of gear 50, to which drum 53 is secured, attempts either to rotate sun gear **13*d* clockwise, or to rotate gear 50 about sun gear 13*d* counterclockwise in planetary fashion, carrying with it plate 45, shaft 13, and the reel of tape attached to reel support plate 40; but because sun gear 13*d* is connected through pulley 41 and belt 42 to a similar system associated with takeup reel shaft 12, and because the reels of tape are connected through the intermediate tape (tape between reels) a tension is produced in the tape, and as the tape is metered past the recording head 15 by capstan 18**, both the supply and takeup reels are turned by the torque provided by the "NegAtor" spring system. The difference between the number of turns an empty takeup reel makes, to take up the tape fed out by one turn of the full supply reel, is absorbed by the differential action of the planetary gear system above described.

In such an arrangement as described, the power required is drawn mainly from the spring drive, with the capstan drive supplying only a minor part of the power, and acting largely as a tape metering device, thereby reducing the size of the motor required, and correspondingly increasing battery life, and operating life on station.

The tape recorder is normally in stand-by condition, i.e., not running, and is awaiting a signal to be recorded, hence, drawing no power. When a signal is to be recorded, it is fed to the recording head and recorded on the stationary tape. At the conclusion of the recording, the tape is stepped forward a suitable distance, for example, 0.005″, and stopped awaiting the next signal to be recorded, after the recording of which the tape is again stepped 0.005″ and stopped for the next signal.

The impulses for operating stepping motor 30 are derived from the same or associated apparatus that supplies signals to be recorded, such as that described in the application of Charles A. Miville, entitled "Magnetic Tape Oceanographic Meter" to which reference has been made hereinbefore.

It should be understood that the "NegAtor" drive described herein may be used in tape recorders for sound and video, by substituting a continuously rotating motor for the stepping motor herein described.

In the foregoing, we have described our invention, and the best mode presently known to us for practicing the same, but it should be understood that modifications and changes may be made without departing from the spirit and scope of our invention, as will be clear to those skilled in the art.

What is claimed is:

1. In a tape recorder having a pair of reel shafts for receiving tape reels, a recording head, and a capstan drive for said tape, the combination with said reel shafts of a pair of flat coil springs respectively tending to rotate said reel shafts in a direction to cause substantially uniform tension in said tape between said reels, driving connections between said springs and said reel shafts respectively, and means for interconnecting said reel shafts.

2. In a tape recorder having a pair of reel shafts for receiving tape reels, a recording head, and a capstan drive for said tape, the combination with said reel shafts of pairs of meshing gears one of each pair being connected to a reel shaft respectively, the second gear of each pair meshing with the shaft-connected gear, and a pair of flat coil springs exerting a driving torque on the second gear of each pair respectively, tending to drive said reel shafts in a direction to cause tension in said tape between reels.

3. The combination claimed in claim 2 with means for interconnecting said reel shafts.

4. In a tape recorder having a pair of reel shafts for receiving tape reels, a recording head, and a capstan drive for said tape, the combination with said reel shafts of a disk mounted on each reel shaft respectively, a flat coil spring mounted on each disk, a drum mounted for rotation on each disk, means for securing the outer end of each of said coil springs to its corresponding drum, a first gear secured to each of said drums and a second gear mounted on each reel shaft, each of said second gears meshing with its corresponding first gear.

5. The combination claimed in claim 4 with means for interconnecting said reel shafts.

6. The combination claimed in claim 4 with tape tension arms, each carrying a tape idler roller, mounted on said reel shafts respectively.

7. The combination claimed in claim 4 with tape tension arms, each carrying a tape idler roller, mounted on said reel shafts respectively, and means for interconnecting said reel shafts.

8. In a tape recorder having a pair of reel shafts for receiving tape reels, a recording head, and a capstan drive for said tape, in combination, a framework having spaced upper and lower decks, a disk mounted on each reel shaft between said decks, a flat coil spring mounted on each disk, a drum mounted on each disk for rotation thereon, and having means for securing the outer end of said flat coil spring, a first gear mounted on said drum, a second gear mounted on each reel shaft and meshing with said first gear, and means for interconnecting said second gears.

9. The combination claimed in claim 8 in which said second gear is mounted for rotation on its respective reel shaft.

10. In a tape recorder, in combination, a pair of reel shafts for receiving tape reels, a recording head, a capstan drive for metering tape feed, said capstan drive comprising a stepping motor, a pair of springs, one spring associated with each reel shaft respectively, tending to rotate said reel shafts in a sense to create tension in said tape, and means for interconnecting said reel shafts, whereby said reel shafts are driven mainly by said springs, with the capstan drive motor supplying only a minor part of the driving power.

11. In a tape recorder, in combination, a pair of reel shafts for receiving tape reels, a recording head, a capstan drive comprising a motor for metering said tape, two pairs of springs, one pair associated with each reel shaft respectively, tending to rotate said reel shafts in a sense to create tension in said tape, and means for interconnecting said reel shafts, whereby said reel shafts are driven mainly by said springs, with the capstan drive motor supplying only a minor part of the driving power.

12. In a tape recorder, in combination, a pair of reel shafts for receiving tape reels, a recording head, a capstan drive comprising a motor for metering said tape, a sun gear associated with each reel shaft, a planet gear meshing with said sun gear, a spring receiving drum mounted on each planet gear, a flat coil spring assembly associated with each drum, and means for interconnecting said reel shafts.

13. In a tape recorder, in combination, a pair of reel shafts for receiving tape reels, a recording head, a capstan drive comprising a motor for metering said tape, a support plate secured to each reel shaft for rotation therewith, a sun gear mounted on each reel shaft, a planet gear meshing with said sun gear mounted on each supporting plate, a flat spring assembly comprising a flat spring mounted on each support plate, spring receiving means mounted on each of said planet gears and having the outer end of its corresponding flat spring secured thereto, and means for interconnecting said reel shafts.

14. In a tape recorder, in combination, a pair of reel shafts for receiving tape reels, a recording head, a capstan drive comprising a motor for metering said tape, a support plate secured to each reel shaft for rotation therewith, a pair of sun gears mounted on each reel shaft, a pair of planet gears meshing with said sun gears mounted on each support plate, a pair of flat coil spring assemblies mounted on each support plate, each of said coil spring assemblies comprising a flat spring, spring receiving elements mounted on each planet gear and each receiving the outer end of one of said flat coil springs, and means for interconnecting said reel shafts.

15. The combination claimed in claim 14 in which said motor is a stepping motor.

16. The combination claimed in claim 14 in which said planet gears and said spring assemblies are mounted symmetrically around each support plate.

17. The combination claimed in claim 14 in which said planet gears and said spring assemblies are mounted symmetrically around each support plate, and said motor is a stepping motor.

References Cited by the Examiner

UNITED STATES PATENTS

| | | | |
|---|---|---|---|
| 2,917,250 | 12/1959 | Bodenstein | 242—55.12 |
| 3,032,286 | 5/1962 | Herrmann | 242—55.14 |

FOREIGN PATENTS

| | | |
|---|---|---|
| 313,672 | 6/1929 | Great Britain. |

STANLEY N. GILREATH, *Primary Examiner.*

LEONARD D. CHRISTIAN, *Examiner.*